United States Patent

[11] 3,605,086

| [72] | Inventor | Matej Karl Triska<br>Box 240 Woodglen Rd., Glen Garden, N.J. 08826 |
|---|---|---|
| [21] | Appl. No. | 818,702 |
| [22] | Filed | Apr. 23, 1969 |
| [45] | Patented | Sept. 14, 1971 |

[54] OIL LEVEL INDICATOR
4 Claims, 4 Drawing Figs.

| [52] | U.S. Cl. | 340/59, 340/244 |
|---|---|---|
| [51] | Int. Cl. | B60q 1/00 |
| [50] | Field of Search | 340/59, 244, 244 B, 244 D |

[56] References Cited
UNITED STATES PATENTS

| 2,613,293 | 10/1952 | Marks | 340/59 |
| 3,204,230 | 8/1965 | Hosford, Jr. | 340/59 |

Primary Examiner—John W. Caldwell
Assistant Examiner—Glen R. Swann, III
Attorney—William H. Maxwell ABSTRACT: An oil level indicator that detects the level or insufficiency thereof in an engine crankcase or the like. Internal combustion engines and in particular automotive engines cannot be inspected during operation for detecting the level of lubricating oil therein. And, since it is imperative that a sufficiency of oil be maintained therein despite whatever malfunction might cause the loss of oil, this invention provides an apparatus in the nature of an attachment that adapts to the crankcase of any usual internal combustion engine, so as to reflect the oil level therein and to provide a signal in the event that said level is insufficient. More particularly, the apparatus is adaptable to existing crankcase openings and fastening points, and provides for adjustability in order to be suited for any prescribed insufficiency as circumstances require. Preferably an electrical contact is made that operates a lighted signal which warns the vehicle operator.

PATENTED SEP 14 1971 3,605,086

INVENTOR.
MATEJ K. TRISKA
BY
W. H. Maxwell

OIL LEVEL INDICATOR

SUMMARY OF THE INVENTION

Internal combustion engines are characterized by the requirement for lubrication and they are invariably provided with lubrication systems involving a supply tank or sump. Most engines have a crankcase sump and it is this type of engine to which the present invention is applicable. Specifically it is the crankcase to which this apparatus is adapted and it is a general object to detect when and if the oil level therein is insufficient. With the present invention a bracket is anchored to the structure and an adapter replaces the usual drain plug, there being a level detection unit adjustably carried upon the said bracket for selective prepositioning as circumstances require.

An object of this invention is to provide an oil level indicator that is suitable to automotive engines, for example, of all sizes and to the end that a positive and reliable indicator is displayed to the vehicle operator or driver during operation of the vehicle. The adjustability hereinabove referred to provides for compliance with all engine requirements, it being a simple matter to install the apparatus for any magnitude of insufficient level that may be desired to be detected.

DESCRIPTION OF THE PREFERRED EMBODIMENT

Figure 1:
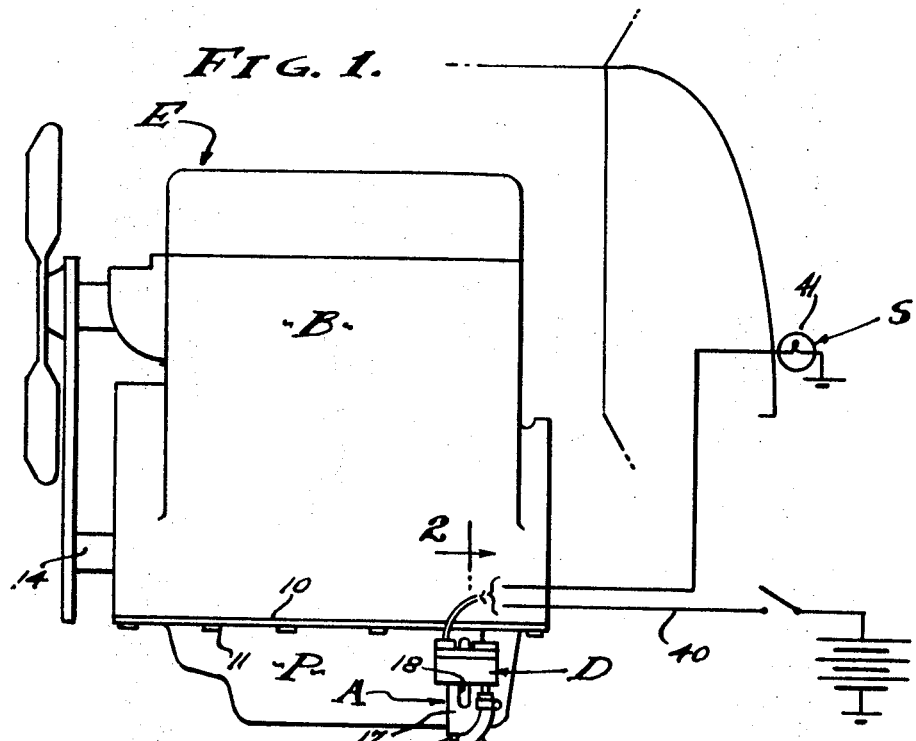
FIG. 1 is a side elevation of a typical installation of the oil level indicator on an automotive engine, showing portions of the automobile in diagram form.
Figure 2:
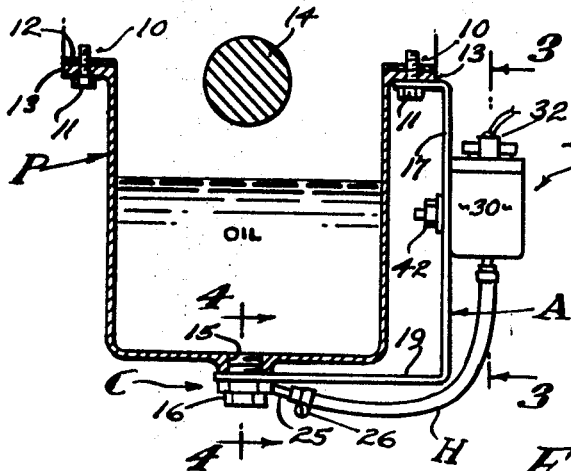
FIG. 2 is an enlarged sectional view taken as indicated by line 2—2 on FIG. 1.
Figure 3:
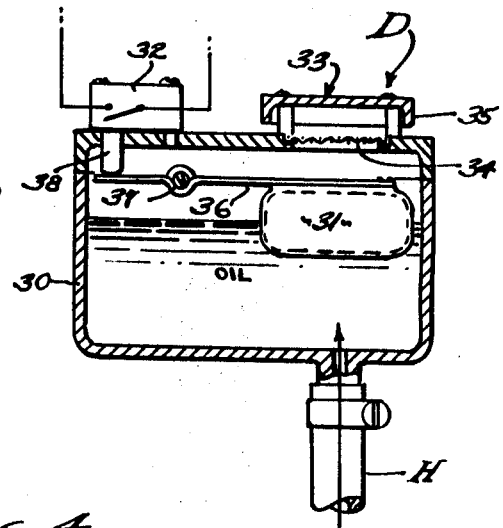
FIGS. 3 and 4 are enlarged detailed views taken as indicated by lines 3—3 and 4—4 on FIG. 2.
Figure 4:
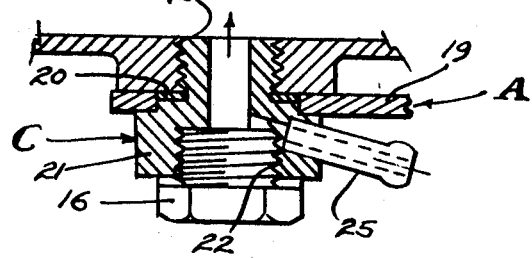

The engine shown in the drawings is a typical internal combustion engine of the type used in automobiles or trucks and the like. As shown, the engine E involves a block B with a head and includes the usual accessories such as manifolding, carburetor, distributor, pump, etc. Typically, the engine block B terminates in a horizontally disposed flange 10 in a plane at the crankshaft axis, and the crankcase per se or pan P is attached to said flange 10 by a multiplicity of screw-threaded fasteners 11 as shown. In practice, a gasket 12 is interposed between the flange 10 and lip 13 of the pan P, there being special seal arrangements where the crankshaft 14 projects from the engine at this point of joinder between the block and pan. Further, such an engine pan P is invariably provided with a drain opening 15 closed by a plug 16, said plug being removed from said opening and reinstalled in accordance with this invention.

Referring now to the oil level indicator, an apparatus is provided in the nature of an attachment for internal combustion engines of the character thus far described, wherein a normal operating level of lubrication oil must be maintained within the engine crankcase or pa P. In the event that the lubrication oil level subsides below a minimum level, then a dangerous condition exists which is detected by said apparatus which involves, generally, a mounting bracket A, a plug adapter C, and oil level detection unit D and signal means S operated by said unit and to be observed by the operator or driver of the vehicle.

The mounting bracket A can vary in design and manner of bracing. Primarily, the bracket A depends from the flange 10 so as to lie along side the pan P and with a vertically disposed section 117 opposite the normal oil level within the pan. Section 17 is provided with a vertically disposed guide 18, preferably an elongated slot of sufficient extent to accommodate all expected adjustments. In order to brace the bracket against excess movements and vibration, the lower extremity thereof is extended by a section 19 toward the crankcase or pan P and secured thereto by the plug adapter C as later described. As shown, the upper extremity thereof is secured to flange 10 and lip 13 by means of one or more of the fasteners 11.

The plug adapter C is unique in its multifunction of maintaining the drain requirement, adding a fluid connection, and adding an anchor point for the above described bracket A. Although the drain opening 15 and its plug 16 are located differently on engines of varying design, a most common location is at the center and toward the rear of the pan P. Therefore, the section 19 is provided with an opening at its terminal end to surround the opening 15 with some clearance. The plug adapter C then installs through said bracket opening and threads into the opening 15 replacing the plug 16 and has a shoulder 20 that stops upon the bottom of the pan P. The head 21 of adapter C is enlarged and thereby captures the terminal end of the bracket section 19, and is provided with a threaded opening 22 duplicating the opening 15. Thus, the plug 16 is reinstalled in the last described opening, there being seals at the pan P and at the plug 16 to ensure leak proof connections.

In accordance with the invention the plug adapter C hereinabove described has a lateral fluid connection in open communication with the passage through the adapter and into the pan P. The connection 25 involves a tubular member with a swaged end adapted to receive and seal with a hose H. A hose clamp 26 ensures the fluid communication coupling engagement and seal.

The level detection unit D is provided and adjustably attached to the bracket A for selective vertical positioning, and comprises a vessel 30 containing a float 31 and mounting a switch 32 responsive to positioning of the float. The vessel is closed by a vented cover 33, the vent being established by a filter screen 34 housed in a cup 35. The float 31 is movable vertically in the vessel 30 as caused by flotation upon an oil level therein, and is captured to swing at one end of a lever 36 having a fulcrum pin 37 captured in a journal between a vessel 30 and its cover 33. Lever 36 is of the first class with float 31 at the one end and with the other end operable against a piston 38 or the like. As shown, piston 38 is movable on an axis disposed normal to said other end of the lever, 36 and operates through the wall of the vessel, preferably through the cover, to operate the switch 32. Thus, when the fluid level, the oil, subsides in vessel 30 the piston 38 is actuated to make contact in the switch 32 and whereupon a mechanical engagement or electrical contact is made.

In its preferred form, the switch is electrical and the contact made thereby is transmitted through a battery powered circuit 40, as shown, to an illuminating signal element S, shown as an incandescent lamp 41 or the like located for convenient observation by the operator or driver of the vehicle.

The oil level indicator is installed as hereinabove described and the vessel 30 adjustably positioned beside the pan P as may be required by the particular engine involved. As shown, the vessel 30 is secured to the guide 18 by a fastener 42 and locked in position thereby. The fore-and-aft pitch of the engine installation is compensated for by revolving the vessel 30 to an optimum horizontal position before tightening the fastener 42. The position selected is determined by relating the float position, when engaged with the piston 38 to close switch 32, to the normal operating oil level within the engine crankcase.

From the foregoing it will be apparent that I have provided a bracket A and plug adapter C combined with the oil level detection unit D, and all of which is unique in its universal adaptability to engine crankcases of the type under consideration, and whereby the sufficiency of oil maintained within the engine during its operation is continuously displayed to the operator.

Having described only a typical preferred form and application of my invention, I do not wish to be limited or restricted to the specific details herein et forth, but wish to reserve to myself any modifications or variations that may appear to those skilled in the art.

Having described my invention, I claim:

1. An oil level indicator for engine lubrication systems wherein oil is to be maintained at a sufficient level within a crankcase or the like, and including, a mounting bracket with means for securement to the side of the crankcase and having a vertically disposed guide, a plug adapter threaded into an opening in the crankcase replacing and threadedly receiving the drain plug thereof and having a lateral fluid connection entering the plug adapter intermediate the two threaded connections thereof and in open communication into the crankcase, said drain plug being installed in and to close said plug adapter, an oil level detection unit selectively positioned vertically of and secured onto the said guide, there being a fluid connection from said lateral connection into said level detection unit, and means responsive to said level detection unit and indicating the level of fluid common in said unit and said crankcase.

2. The oil level indicator as set forth in claim and wherein the mounted bracket is braced by means of extending its lower extremity to the first mentioned threaded connection and captured between the crankcase and the said plug adapter.

3. The oil level indicator as set forth in claim 1 and wherein the mounting bracket guide has a slotted opening and the oil level detection unit is rotatably oriented to a horizontal disposition while being positioned vertically, wherein the mounting bracket is braced by means of extending its lower extremity to captured engagement with the said plug adapter, there being a threaded fastener extending from the level detection unit and through said slotted opening and a nut means for securement in the selected and rotatably oriented position.

4. The oil level indicator as set forth in claim 1, wherein the mounting bracket guide has a slotted opening and the oil level detection unit is rotatably oriented to a horizontal disposition while being positioned vertically, wherein the mounting bracket is braced by means of extending its lower extremity to captured engagement with the said plug adapter, there being a threaded fastener extending from the level detection unit and through said slotted opening and a nut means for securement in the selected and rotatably oriented position, and wherein the oil detection unit comprises a vented and otherwise closed vessel with a float captured therein for vertical movement and into engagement with a piston operating a normally open electrical switch, and the means responsive to said level detection unit comprising a light energized through a battery powered circuit wen the said switch is closed by lowering of the float.